Figure 1:
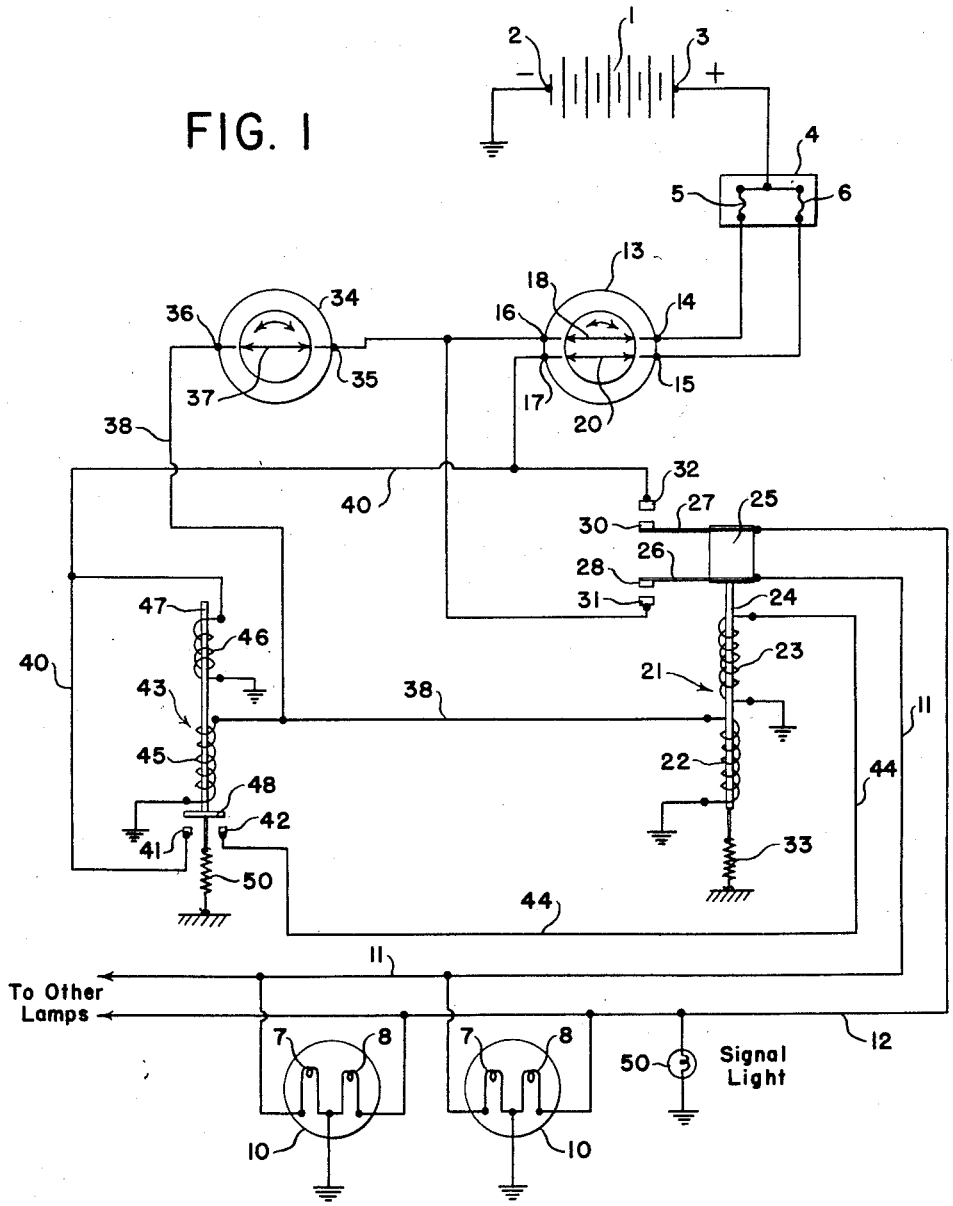

May 19, 1959

C. A. SENDEL 2,887,616

VEHICLE LIGHTING SYSTEM

Filed Jan. 31, 1955

2 Sheets-Sheet 1

INVENTOR.
Charles A. Sendel

BY

ATTORNEYS

May 19, 1959
C. A. SENDEL
2,887,616
VEHICLE LIGHTING SYSTEM
Filed Jan. 31, 1955
2 Sheets-Sheet 2
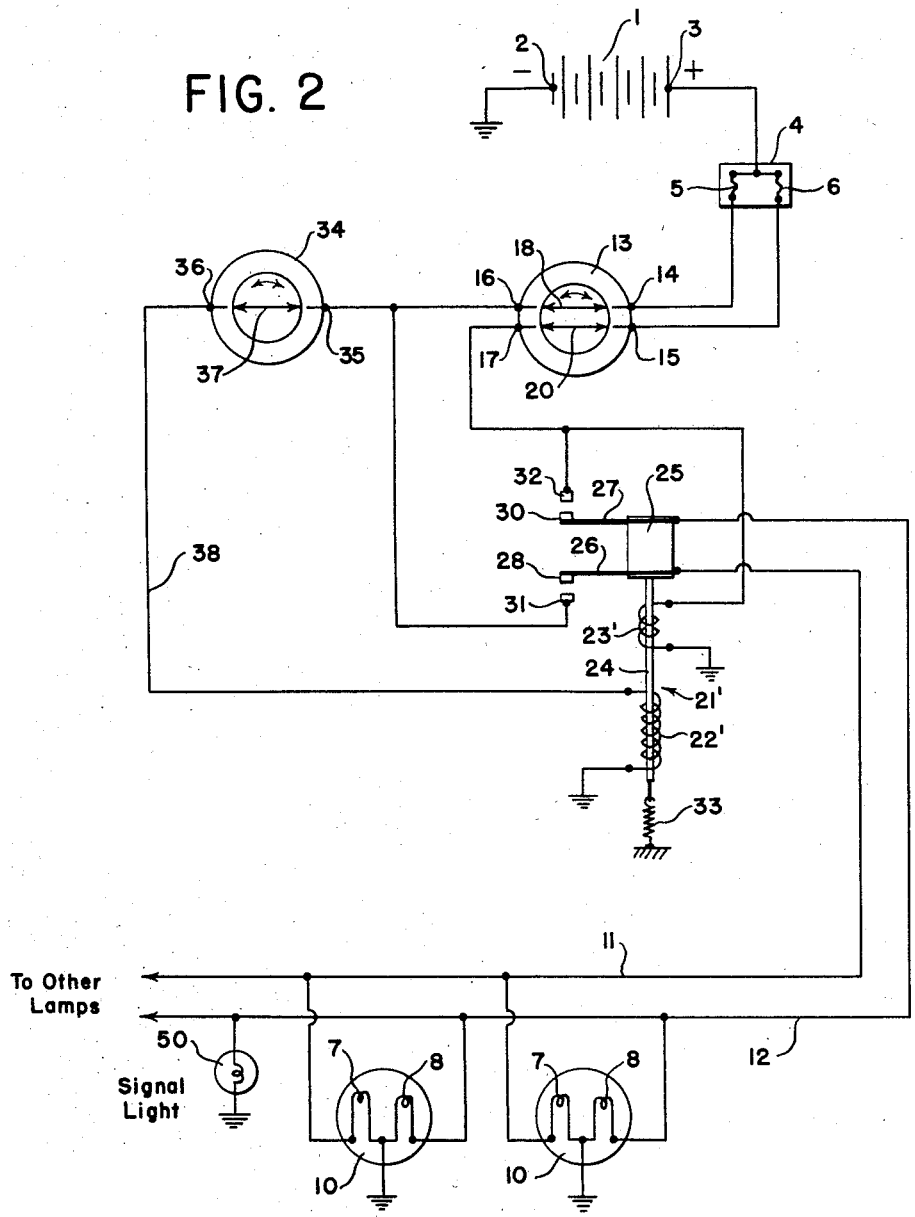
INVENTOR.
Charles A. Sendel
BY
ATTORNEYS dynamic # United States Patent Office 2,887,616
Patented May 19, 1959

2,887,616

VEHICLE LIGHTING SYSTEM

Charles A. Sendel, Weatherly, Pa.

Application January 31, 1955, Serial No. 485,014

7 Claims. (Cl. 315—83)

This invention relates to wiring circuits and more particularly to duplex wiring circuits for insuring continuity of lighting service.

There are many types of vehicle lighting systems in which safety considerations require positive continuity of the service in order that accidents may be avoided and the inconveniences due to outage of the lighting system may be minimized. For example, the failure of a component in the lighting system of a motor vehicle may have serious consequences not only to the occupants and the operator of the vehicle itself, but also to the occupants of other vehicles on the road.

I have invented a duplex wiring circuit for application in motor vehicles which insures continuity of lighting service. A feature of my invention is the automatic and positive operation thereof in switching the lights energized from one side of a duplex circuit to another upon the occurrence of a short circuit and resultant blown fuse of the first side of the circuit. This feature of my invention provides for maximum safety in the operation of vehicles.

Another feature of my invention is the easy manual substitution of one side of a duplex lighting circuit for another in the event of failure of a light in the first side of the duplex circuit.

The foregoing features of my invention are achieved with the use of relatively simple and inexpensive parts which require little or no continuing maintenance to insure positive and long-lived operation of the duplex wiring circuit.

These and other features of my invention are found in the following detailed description of particular embodiments of my new duplex wiring circuit. For a full and complete description of these circuits, attention is directed to the specification and the accompanying drawings in which:

Fig. 1 is a schematic view of a duplex wiring circuit according to my invention; and Fig. 2 is a modification of the wiring circuit of Fig. 1.

The wiring diagram shown in Fig. 1 is a particular embodiment of my invention which is especially suited for use in motor vehicles. This system comprises the usual storage battery 1 having a terminal 2 connected to a common ground conductor. The other terminal 3 of the battery is connected to a common input terminal of a fuse box 4 having fuses 5 and 6 of any conventional type.

The fuse 5 is used to protect a circuit for energizing the filaments 7 of lamps 10 while the fuse 6 is used to protect another circuit for energizing the filaments 8 of lamps 10. As indicated in the figure the lamps 10 are dual-filament types having a common connection to ground for the filaments 7 and 8 while the other ends of the filaments 7 and 8 are connected respectively to the lines 11 and 12. It will be understood that any of such dual-filament lamps may be connected across the lines 11 and 12 as required to provide complete illumination at all portions of the vehicle.

I provide a main manual control switch 13 having input terminals 14 and 15 and output terminals 16 and 17. The switch is preferably of the rotary type having internal conductive members 18 and 20, the conductor 18 being adapted to connect the input terminal 14 to the output terminal 16 and the conductor 20 being adapted to connect the input terminal 15 to the output terminal 17 when the switch is in the "on" position as shown in the figure. The terminal 14 is connected to the positive terminal of the battery through the fuse 5 while the terminal 15 is connected to the terminal 3 of the battery through the fuse 6.

For the purposes of the following discussion I shall denominate that side of my new duplex circuit connected to the terminal 16 as the main side of the circuit while that side of the circuit connected to the terminal 17 will be referred to as the auxiliary side. As indicated generally at 21 there is provided a relay actuated switch which is preferably of the differentially wound type having coils 22 and 23 and an armature 24, one end of which is fixed to an insulating fiber block 25. Mounted on this block are two conductive switch blades 26 and 27 which carry contacts 28 and 30 respectively. These contacts are arranged to connect with the switch terminals 31 and 32 respectively, the terminal 31 being connected to the output terminal 16 of the manual switch 13 and the terminal 32 being connected to the terminal 17 of the manual switch. The switch blade 26 is connected to the line 11 while the switch blade 27 is connected to the line 12 as shown.

As previously stated the relay switch is of the differentially wound type having oppositely acting coils 22 and 23. When the coil 22 is energized the armature 24 is pulled in the downward direction so that the contact 28 engages the terminal 31, thereby forming a complete circuit on the main side of the duplex circuit from the terminal 3 of the battery, through the fuse 5, the switch conductor 18, the switch blade 26, and the line 11 with a ground return to battery terminal 2 from the filaments 7 of the lamps 10. Similarly, when the coil 23 is energized the armature 24 is moved to the upward position so that the contact 27 engages the terminal 32, thereby completing the auxiliary side of the duplex circuit from the terminal 3 of the battery, through the fuse 6, the switch conductor 20, the switch blade 27, and the line 12 with a ground return from the filaments 8 of the lamps 10.

In this particular embodiment I also provide a tension spring 33 adapted to assist the coil 22 in maintaining engagement between the contact 28 and the terminal 31. In the event of a non-shorting failure of the coil 22, this spring maintains the switch in the downward position.

The main relay switch coil 22 is energized through a circuit from the main manual switch terminal 16 which includes an auxiliary switch 34 having an input terminal 35 and an output terminal 36. This switch also has an internal rotary conductor 37 adapted to connect the input and output terminals thereof when the switch is in the "on" position as indicated in Fig. 1. The output terminal 36 is connected to the coil 22 by conductor 38.

The other main relay switch coil 23 is energized through a circuit which includes conductor 40 from the main relay switch terminal 32 to one of the terminals 41 of an auxiliary relay generally indicated at 43. The other terminal 42 of the switch 43 is connected directly to the main relay switch coil 23 by conductor 44.

The auxiliary relay switch is also of the differentially wound type provided with a pair of oppositely acting coils 45 and 46, the coil 45 being especially adapted to exert a greater actuating force in the upward direction on the relay switch armature 47 than is exerted in the downward direction by the coil 46 when the coils are simultaneously energized. As indicated in Fig. 1 the coil 45 is connected to the auxiliary manual switch terminal 36 by the conductor 38 and the coil 46 is connected to the main relay switch terminal 32 by the conductor 40. Each of the coils 45 and 46 has a ground return to complete their respective circuits.

Under conditions of normal operation the coils 45 and 46 are simultaneously and continuously energized. As previously stated, the coil 45 exerts a greater force in the upward direction than is provided by the coil 46 in the downward direction, thereby holding the switch armature 47 and its contacting member 48 upward and out of contact with the switch terminals 41 and 42. By virtue of this arrangement, normally only the coil 22 of the main relay switch is energized. However, if for any reason the main side of the circuit including the fuse 5 should fail, thereby deenergizing the auxiliary relay switch coil 45, the coil 46 of this relay assumes control of the armature 47 and moves it to the downward position so that its contacting member 48 connects the terminals 41 and 42. This completes a circuit from the main relay switch terminal 32 through the conductors 40 and 44 to energize the main relay switch coil 23.

In this particular embodiment I also provide a coil spring 50 which is arranged to aid the coil 46 in bringing the armature 47 of the auxiliary relay switch 43 into the downward position upon failure of the circuit energizing the relay coil 45.

To simplify the wiring diagram no condensers have been shown across the various contacts and terminals, but one skilled in the art will readily understand that such condensers may be used wherever necessary and appropriate to eliminate sparking and resultant deterioration of the switch contacts and the terminals.

The operation of the embodiment of my invention shown in Fig. 1 is as follows. When the system is idle the main manual switch 13 is in the "off" position, thereby opening the connections between the terminals 14 and 16 and between 15 and 17. Neither of the main relay switch coils is energized in this condition. Therefore, the coil spring 33 holds the switch blades in the downward position so that contact 28 engages terminal 31. Under normal conditions the auxiliary manual switch 34 is left in the "on" position shown in Fig. 1. Its purpose will be described in greater detail below.

When it is desired to energize the lights which illuminate the vehicle and the road, track or other path along which the vehicle travels, the main manual relay switch 13 is turned to the "on" position, thereby completing the main circuit through the fuse 5, the switch 13 and the switch blade 26 to the filaments 7 of the lamps 10, and the auxiliary relay switch coils 45 and 46 are simultaneously energized. As previously explained these latter coils are differentially wound and the coil 45 is stronger than the coil 46. Therefore, the armature 47 is lifted off the terminals 41 and 42 against the combined downward force of the coil spring 50 and the relay coil 46. Thus, the circuit to the main relay switch coil 23 is open and only the main relay switch coil 22 is energized. So long as the coil 22 is energized, it combines with the force in the coil spring 33 to hold the switch blade 26 in the downward position to maintain the connection at the contact 28 and the terminal 31. In this condition my duplex wiring circuit operates as do conventional motor vehicle wiring circuits. However, in a conventional wiring circuit the failure for any reason of a fuse corresponding to the fuse 5 would require that the trouble be remedied and the fuse replaced before the circuit could be put back in operation.

In the duplex wiring circuit according to my invention, failure of the fuse 5 deenergizes the normal circuit supplying power to the filaments 7 and simultaneously deenergizes the circuit from the terminal 16 through the manual switch 34 to the auxiliary relay switch coil 45 and to the main relay switch coil 22 through the conductor 38. As previously stated, the coil 46 is continuously energized through the separate circuit from the fuse 6 through the switch 13 to the terminal 32 and thence through the conductor 40. Upon deenergization of the coil 45 the coil 46, with the assistance of the coil spring 50, moves the relay armature 47 into its downward position so that the armature contact member 48 connects terminals 41 and 42, thereby energizing the main relay switch coil 23. The force on the main relay switch armature 24 exerted by the coil 23 is sufficient to overcome the tension in the coil spring 33 and move the switch blade 27 upward so that the contact 30 engages the terminal 32. As is readily apparent this establishes the auxiliary side of the circuit through the fuse 6, the main manual switch 13, the switch blade 27, to the filaments 8 of the lamps 10 and the lighting circuit is immediately returned to service. At most the period during which the lamps 10 are dark amounts to a fraction of a second and is only as long as is required for the relays to operate.

The purpose of the switch 34 is two fold. The first is to permit testing of the auxiliary side of the circuit even though the normal side is operating properly. This test may be simply carried out by turning the switch 34 to its "off" position which, so far as the effect on the auxiliary relay switch is concerned, is the same as a failure of the fuse 5. The coil 46 then assumes control of the armature 47 and the auxiliary side of the circuit to the filaments 8 of the lamps 10 is brought into operation. Returning the switch 34 to its "on" position restores operation of the normal side of the circuit to the filaments 7.

The second purpose of the switch 34 is to permit substitution of the auxiliary circuit for the normal circuit in the event that one of the filaments 7 burns out. In such case the relays do not respond and that portion of the vehicle normally lighted by the burned out filament is dark. Simply by turning the switch 34 to its "off" position the auxiliary side of the duplex circuit is brought into operation. The filaments 8 may then be utilized for illumination until the lamp having the defective filament 7 can be replaced, at which time the switch 34 is returned to the "on" position and the normal side of the circuit is restored to operation.

In the embodiment of Fig. 1 the springs 33 and 50 have a useful function although they are not essential to the general operation of my new circuit. Consider first the situation where fuse 5 has been blown due to a short in the main circuit. According to my invention coil 23 of the main relay switch 21 is then automatically energized, thereby switching on the filaments 8 of the auxiliary circuit. This is accomplished by the coil 46 of the auxiliary relay switch 43 assuming control of the armature 47 to complete the circuit including the contacts 41 and 42. However there still exists the possibility of a non-shorting failure of the coil 46. In the absence of the spring 50 the armature of the auxiliary relay would be left without positive control which might result in the connection between the contacts 41 and 42 being alternately made and broken as the armature floated at random due to the motion of the vehicle. The result would be a constant flickering of the filaments 8. The spring 50 is provided to preclude this undesirable situation.

The spring 33 will also forestall a similar difficulty which might arise if both of the coils 22 and 23 of the main relay switch 21 were to fail but the failure of coil 22 did not cause the fuse 5 to blow. In such circumstances the main side of the duplex circuit would still be energized through the fuse 5, but the armature 24 would not be positively controlled which would render the entire system inoperative until repairs could be made. Therefore, the spring 33 is provided to act on the armature 24 to close the main relay switch at the contacts 28 and 31 so that the main side of the circuit is complete and filaments 7 are lighted.

A modification of the wiring circuit according to my invention is illustrated in Fig. 2. With this modification the auxiliary relay switch may be omitted while retaining substantially the same desirable features of safety of operation. Throughout the following description, components having the same functions as those of Fig. 1 are designated by the same reference numerals. In this modified embodiment the connections between the battery 1 and the fuse box 4, the main manual switch 13 and the terminals 31 and 32 are the same as in the embodiment of Fig. 1. The main relay switch 21' is different from the corresponding relay switch 21 in that the coils 22' and 23' are differentially wound to effect oppositely acting forces as before, but the coil 22' is stronger than the coil 23'. When in operation the coil 23' is continuously energized through a connection from the terminal 17 of the main manual switch 13 and the coil 22' is continuously energized through a connection from the terminal 16 of the main switch 13 through the auxiliary manual switch 34 and the connection 38 while the switch 34 is in the "on" position. Due to the difference in the actuating forces of the coils 22' and 23' when both are energized, the armature 24 is normally held in the downward position with the assistance of the spring 33 so that the contact 28 is in engagement with the terminal 31, thereby completing the main circuit to the filaments 7 of the lamps 10. Upon failure of the elements of the main circuit which results in a blowout of the fuse 5, the main relay coil 22' is deenergized and the coil 23' raises the armature 24 to bring the contact 30 on switch blade arm 27 into engagement with the terminal 32. While the force produced by the coil 23' is not as great as the oppositely acting force produced by the coil 22', the force produced by coil 23' must be great enough to overcome the tension in spring 33 and to maintain a firm contact between the contact 30 and the terminal 32. With the armature 24 in the upward position the auxiliary circuit to the filaments 8 of the lamps 10 is completed through the fuse 6. Thus, the modified embodiment of Fig. 2 affords substantially the same features found in the embodiment of Fig. 1.

The manual switch 34 performs the same two functions in the embodiment of Fig. 2 that the switch performs in the embodiment of Fig. 1, namely, it provides means for testing the auxiliary circuit to the filaments 8 and it also permits intentional switching to the filaments 8 when one of the filaments 7 burns out.

It will also be noted that in this embodiment the spring 33 operates to maintain the armature in the downward position so that the contact 28 is in engagement with the terminal 31 even though the relay coil 22' should burn out.

For example, the main relay switches and the auxiliary relay switches need not be of the solenoid type having an armature as shown in the drawings. They may be replaced by switches having simple electromagnets wound to effect the appropriate polarity to operate by magnetic attraction upon a metallic part of the switch itself.

In either of the embodiments described above, it may be desirable to provide a signal light appropriately located in the cab of the vehicle to indicate that the auxiliary side of the circuit is in service and that the main side of the circuit requires some attention such as, for example, the replacement of fuse 5. Such a signal light may be of the conventional single filament variety connected between the lead 12 energizing the filaments 8 and ground.

Having thus described two particular embodiments of my invention, it is to be understood that these descriptions are merely for the purposes of illustration and are not to be construed as limitations on the scope of the invention as defined in the subjoined claims.

I claim:

1. A duplex wiring system for vehicles comprising a battery and at least one two-filament lamp, a manual switch adapted to make and break two separate circuits and having first and second input terminals and first and second output terminals, first and second fuses connected between said first and second input terminals respectively and one terminal of said battery, a main relay switch having first and second oppositely acting actuating coils and adapted to connect said first output terminal to one of the filaments of said lamp when said first coil is energized and to connect said second output terminal to the other of the filaments of said lamp when said second coil is energized, an auxiliary relay switch having first and second differentially wound actuating coils, said first auxiliary coil being connected to said first output terminal to maintain said auxiliary switch open when the circuit to said first filament is energized, and said second auxiliary coil being connected to said second output terminal and adapted to close said auxiliary switch when said first auxiliary coil is deenergized, said auxiliary switch being connected in a circuit between said second output terminal and said second main relay coil to energize the latter when said auxiliary switch is closed, and a ground return from said coils and filaments to the other terminal of said battery, whereby, upon failure of said first fuse, the auxiliary relay automatically closes and causes said main relay switch to connect said second filaments to said battery through said second fuse.

2. A duplex wiring system for vehicles according to claim 1 and having a manually operated auxiliary switch in the connection between said first output terminal and said first auxiliary coil.

3. A duplex wiring system for vehicles comprising a battery and at least one two-filament lamp, a main manual switch adapted to make and break two separate circuits and having first and second input terminals and first and second output terminals, fuses connected between each of said input terminals and one terminal of said battery, a relay switch having differentially wound first and second actuating coils and adapted to connect said first output terminal to the first of said filaments when said first and second coils are energized through connections to said first and second output terminals, respectively, and to connect said second output terminal to said second filaments when said second coil only is energized through a connection to said second output terminal, and a ground return from said coils and filaments to the other terminal of said battery, whereby, upon failure of said first fuse, said first coil is deenergized and said second coil causes said relay switch to connect said second filaments to said battery through said second fuse.

4. A duplex wiring system for vehicles according to claim 3 and having a manually operated switch in the connection between said first output terminal and said first coil.

5. A duplex wiring system for vehicles comprising a battery and at least one two-filament lamp, a main manual switch adapted to make and break two separate circuits and having first and second input terminals and first and second output terminals, first and second fuses connected between said first and second input terminals respectively and one terminal of said battery, a relay switch having first and second differentially wound actuating coils adapted to complete a main circuit between said first output terminal and said first filament when said first coil is energized and adapted to complete an auxiliary circuit between said second output terminal when only said second coil is energized, and means constructed and arranged to energize said first coil through a circuit including said first fuse, and means constructed and arranged to energize said second coil through a circuit including said second fuse, means adapted to control the actuation of said relay switch by said second coil upon failure of said first fuse, and a ground return from said coils and filaments to the other terminal of said battery.

6. A duplex wiring system for vehicles comprising a battery and at least one two-filament lamp, a main manual switch adapted to make and break two separate circuits and having first and second input and first and second output terminals, first and second fuses connected between said first and second input terminals, respectively, and one terminal of said battery, a relay switch having first and second differentially wound actuating coils, said first coil being constructed to effect a greater actuating force than said second coil, said relay switch adapted to complete a main circuit between said first fuse and said first filament when said first coil is energized and to complete an auxiliary circuit between said second fuse and said second filament when only said second coil is energized, means for energizing said first and second coils through circuits including said first and second fuses respectively, and a ground return from said coils and filaments to the other terminal of said battery, whereby said second coil actuates said relay switch to complete said circuit between said second fuse and said second filament upon failure of first fuse.

7. A duplex wiring circuit for vehicles according to claim 6 and having manual means for rendering inoperative said means for energizing said first coil.

References Cited in the file of this patent
UNITED STATES PATENTS

| | | |
|---|---|---|
| 2,087,029 | Gordon | July 13, 1937 |
| 2,223,251 | Hack | Nov. 26, 1940 |
| 2,342,639 | Bradley | Feb. 29, 1944 |
| 2,427,076 | Tabbachi | Sept. 9, 1947 |
| 2,528,245 | Riggins | Oct. 31, 1950 |
| 2,540,410 | Wagner | Feb. 6, 1951 |
| 2,693,551 | Hall | Nov. 2, 1954 |

UNITED STATES PATENT OFFICE
CERTIFICATE OF CORRECTION

Patent No. 2,887,616                                                May 19, 1959

Charles A. Sendel

It is hereby certified that error appears in the printed specification of the above numbered patent requiring correction and that the said Letters Patent should read as corrected below.

Column 1, line 68, after "that any" insert -- number --; column 5, line 26, after "failure of" insert -- one of --.

Signed and sealed this 15th day of September 1959.

(SEAL)
Attest:

KARL H. AXLINE                                                   ROBERT C. WATSON
Attesting Officer                                            Commissioner of Patents